United States Patent Office 2,875,193
Patented Feb. 24, 1959

2,875,193

NEW DIRECT-DYEING AZO-DYESTUFFS AND PROCESS FOR THEIR MANUFACTURE

Henri Riat, Arlesheim, Switzerland, assignor to Ciba Limited, Basel, Switzerland, a Swiss firm No Drawing. Application May 20, 1957
Serial No. 660,095

7 Claims. (Cl. 260—158)

This invention provides new direct-dyeing azo-dyestuffs which like, for example, the disazo-dyestuff of the formula (1)
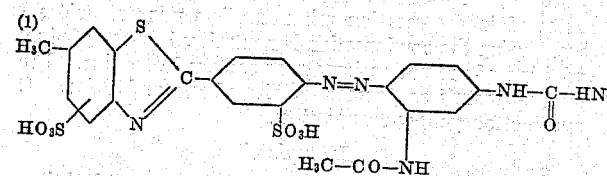

correspond to the formula (2)
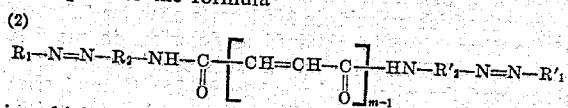

in which $R_1$ and $R_1'$ each represents the radical of a 2-phenyl-(1')-benzthiazole bound in the 4'-position to the azo linkage and containing at least one sulfonic acid group, $R_2$ and $R_2'$ each represents a benzene radical which is bound in the 4-position to the —NH— group and in the 1-position to the azo linkage and contains in the 2-position an acylamino group, and $m$ represents a whole number not greater than 2.

The invention also provides a process for the manufacture of the new dyestuffs of the Formula 2 wherein dyestuffs of the formula (4) $\quad R_1—N=N—R_2—NH_2$ in which $R_1$ and $R_2$ have the meanings given above, are linked together by means of a compound of the formula (3)
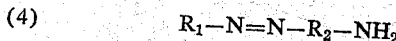

in which $m$ represents a whole number not greater than 2, to form a disazo-dyestuff.

The amino-azo-dyestuffs of the Formula 4 can be prepared by coupling diazotized 2-[4'-aminophenyl-(1')]-benzthiazoles containing at least one sulfonic acid group with a 1-amino-3-acylaminobenzene.

Accordingly, there are used for preparing the amino-azo-dyestuffs of the Formula 4 diazo-components containing at least one sulfonic acid group and having the formula (5)
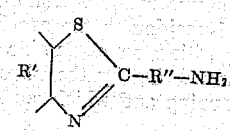

in which R' represents a benzene radial fused on in the manner shown to the thiazole ring, and R'' represents a benzene radical to which the amino group is bound in para-position to the bond connecting it to the thiazole ring, at least one of the benzene radicals containing a sulfonic acid group and, if desired, both benzene radicals may contain further substituents, for example, halogen atoms such as chlorine, methoxy or ethoxy groups. Owing to the ease with which they can be obtained and the good results obtained therewith there come into consideration more especially sulfonic acids of 2-(4'-aminophenyl)-6-methyl-benzthiazole, for example, the 2-(4'-aminophenyl)-6-methyl-benzthiazole-x-sulphonic acid obtainable by sulfonating 2-(4'-aminophenyl)-6-methyl-benzthiazole with concentrated sulfuric acid, or 2-(4'-aminophenyl) - 6 - methyl - benzthiazole - 3' - sulfonic acid which is obtainable by thermal rearrangement of the acid sulfate of 2-(4'-aminophenyl)-6-methyl-benzthiazole. Especially advantageous are disulfonic acids, for example, the disulfonic acid of the formula (6)
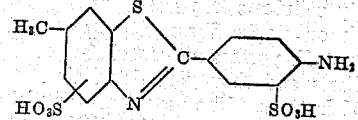

which is obtainable by the thermal rearrangement of

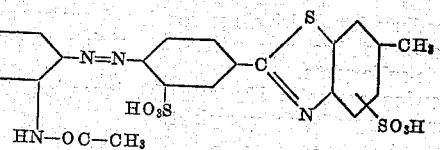

the acid sulfate of the monosulfonic acid obtainable by sulfonating 2 - (4' - aminophenyl) - 6 - methyl - benzthiazole with concentrated sulfuric acid.

The diazotized 2-(4'-aminophenyl)-benzthiazoles containing a sulfonic acid group are coupled with 1-amino-3-acylaminobenzenes. The latter may contain, especially in the 6-position, further substituents, for example alkyl or alkoxy groups of low molecular weight such as methyl, ethyl, methoxy or ethoxy groups. The acylamino group in the 3-position is advantageously derived from a carboxylic acid of low molecular weight, for example, it may be a formylamino, acetylamino, propionylamino, hydroxyacetylamino, hydroxypropionylamino or $H_2N—CO$-group. Accordingly, there may be used with advantage, for example, 1-amino-3-acylamino-benzenes of the formula (7)
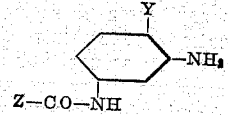

in which Y represents a hydrogen atom or an alkyl or alkoxy group of low molecular weight, and Z represents an ethyl or hydroxymethyl group but especially a methyl group or an $H_2N$-group. As examples of 1-amino-3-acylaminobenzenes of the Formula 7 there may be mentioned 1-amino-3-acetylamino-benzene, 1-amino-3-propionylaminobenzene, 1-amino-3-hydroxyacetyl-aminobenzene, 1 - amino - 3 - acetylamino - 6 - methoxybenzene, (3-amino-phenyl)-urea and (3-amino-4-methoxyphenyl)-urea.

The diazotized 2-(4'-aminophenyl)-benzthiazoles may be coupled with the 1-amino-3-acylaminobenzenes in the usual manner, and advantageously in a weakly acid to neutral, for example, acetic acid, medium.

In the process of this invention the amino-monoazo-dyestuffs so obtained are linked together by means of an acid halide of the Formula 3, for example, fumaric acid dichloride or advantageously phosgene, to form the disazo-dyestuffs. For this purpose, for example, equimolecular proportions of two different amino-monoazo-dyestuffs, which are both of the Formula 4, are reacted with phosgene, or by reacting a single amino-monoazo-dyestuff of the Formula 4 with phosgene or fumaric acid dichloride a unitary symmetrical urea or fumaric acid derivative is obtained. It is usually of advantage so to select the starting materials that the final product obtained contains an average of at least three sulfonic acid groups, that is to say, when a single amino-monoazo-dyestuff is used it should contain two sulfonic acid groups and when an equimolecular mixture of two different amino-monoazo-dyestuffs is used at least one of these dyestuffs should contain two sulfonic acid groups and the other one or two sulfonic acid groups.

For linking together the amino-monoazo-dyestuffs in the process of this invention, especially when phosgene is used for the reaction, it is generally of advantage to add an agent capable of binding acid, such as an alkali metal carbonate.

The new dyestuffs of the Formula 2 are suitable for dyeing or printing a very wide variety of materials, especially those of animal origin, such as wool, silk or leather, but especially cellulosic fibers such as linen, cotton, and artificial silk or staple fibers or regenerated cellulose. The new dyestuffs possess an especially good affinity for the latter fibers and they yield level tints having good properties of fastness. The new dyestuffs yield on cellulosic fibers dyeings which can be discharged very well not only by means of the known neutral discharge pastes containing sodium formaldehyde-sulfoxylate, but also with the usual alkaline discharge pastes containing sodium formaldehyde-sulfoxylate.

The following examples illustrate the invention, the parts and percentages being by weight:

*Example 1*

The diazo compound prepared from 40 parts of 2-(4'-aminophenyl)-6-methyl-benzthiazole-3'-x-disulfonic acid (dehydrothiotoluidine disulfonic acid) in the usual manner is coupled in an acetic acid solution with 15 parts of 1-amino-3-acetylaminobenzene. The monoazo-dyestuff so obtained can be purified by reprecipitation. It is dissolved in 3000 parts of water and the solution is treated at 40–60° C. with phosgene until aminoazo-dyestuff can no longer be detected, the reaction mixture being maintained weakly alkaline by the addition of sodium carbonate. The precipitated dyestuff is filtered off and dried. It dissolves in water to give a yellow-orange coloration and dyes cotton orange tints which are fast to light. The dyeings are dischargeable to white.

By using as azo-component for preparing the monoazo-dyestuff, instead of 1-amino-3-acetylaminobenzene, 15 parts of (3-aminophenyl)-urea, there is obtained a dyestuff which dyes cotton redder tints. Further disazo-dyestuffs which dye cotton orange tints are obtained by using as coupling components for preparing the amino-monoazo-dyestuff 1-amino-3-propionylaminobenzene, 1-amino-3-hydroxyacetylaminobenzene or 1-amino-3-acetylamino-6-methyl benzene. Finally, by using, instead of 1-amino-3-acetylaminobenzene, the corresponding quantity of 1-amino-3-acetylamino-6-methoxybenzene or (3-amino-4-methoxyphenyl)-urea, there are obtained dyestuffs which dye cotton dull red tints.

*Example 2*

28 parts of the amino-azo-dyestuff described in the first paragraph of Example 1 are dissolved in 4000 parts of water together with 24 parts of the azo-dyestuff obtained from diazotized 2-(4'-aminophenyl)-6-methylbenzthiazole-x-sulfonic acid and 1-amino-3-acetylaminobenzene, and treated with phosgene in the manner described in Example 1 until the amino group can no longer be detected. The dyestuff so obtained dyes cotton yellow-orange tints.

A similar dyestuff is obtained when 28 parts of the amino-azo-dyestuff described in the first paragraph of Example 1 and 24 parts of the amino-azo-dyestuff obtained from diazotized 2-(4'-aminophenyl)-6-methyl-benzthiazole-x-sulfonic acid and (3-aminophenyl)-urea are dissolved in 4000 parts of water and treated with phosgene in the manner described in Example 1.

*Example 3*

40 parts of the monoazo-dyestuff described in the first paragraph of Example 1 are dissolved in 3000 parts of water, and treated with fumaric acid dichloride at a temperature of 30–40° C. until no free amino group can be detected in the reaction mixture. The mineral acid set free during the condensation is neutralized by the gradual addition of sodium carbonate or sodium hydroxide. The disazo-dyestuff so formed is filtered off and dried. It dyes cotton yellow-orange tints.

*Example 4*

100 parts of cotton satin are introduced at 60° C. into a dyebath which contains in 3000 parts of water 1.5 parts of the disazo-dyestuff obtained as described in the first paragraph of Example 1 and 2 parts of trisodium phosphate, and the whole is heated to 90–95° C., and after ¼ hour 30 parts of crystalline sodium sulfate are added, and then dyeing is continued for ½ hour at about 95° C. The material is then rinsed in the cold and dried. The cotton is dyed an orange tint.

On the cotton satin dyed in this manner pure white discharge prints can be made by means of the alkaline discharge printing paste of the following composition:

200 parts of sodium formaldehyde-sulfoxylate
120 parts of water
550 parts of British gum thickening, 1:1
80 parts of potassium carbonate
50 parts of glycerine 1000 parts

What is claimed is:
1. A disazo dyestuff of the formula

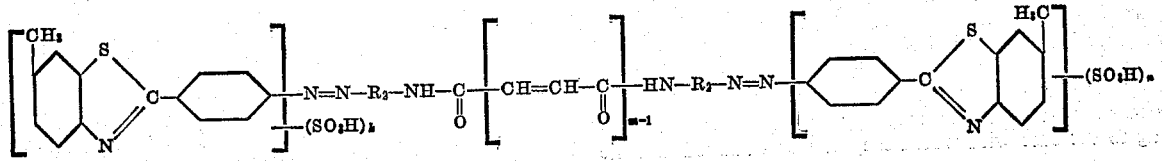

in which $k$, $m$ and $n$ each represent a whole number of at least 1 and at the most 2, and $R_2$ and $R_2'$ each represent a benzene radical bound in the 4-position to the —NH— group and in the 1-position to the azo linkage and containing in the 2-position an acylamino group which is bound to the benzene ring by the nitrogen atom of its —NH—CO— grouping and which contains at the most 3 carbon atoms.

2. A disazo dyestuff of the formula

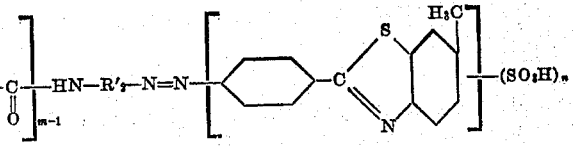

in which $k$, $m$ and $n$ each represent a whole number of at least 1 and at the most 2, and $R_2$ represents a benzene radical bound in the 4-position of the —NH— group and

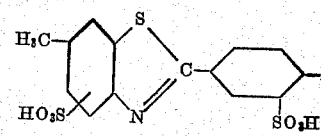

in the 1-position to the azo linkage and containing in the 2-position an acylamino group which is bound to the benzene ring by the nitrogen atom of its —NH—CO— grouping and which contains at the most 3 carbon atoms.

3. A disazo dyestuff of the formula

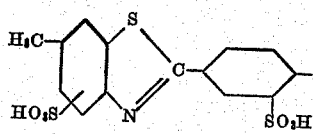

in which $m$ represents a whole number of at least 1 and at the most 2 and $R_2$ represents a benzene radical bound in the 4-position to the —NH— group and in the 1-position to the azo linkage and containing in the 2-position an acylamino group which is bound to the benzene ring by the nitrogen atom of its —NH—CO— grouping and which contains at the most 3 carbon atoms.

4. A disazo dyestuff of the formula

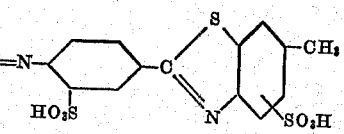

in which $R_2$ represents a benzene radical bound in the 4-position to the —NH-group and in the 1-position to the azo linkage and containing in the 2-position an acylamino group which is bound to the benzene ring by the nitrogen atom of its —NH—CO— grouping and which contains at the most 3 carbon atoms.

5. The disazo dyestuff of the formula

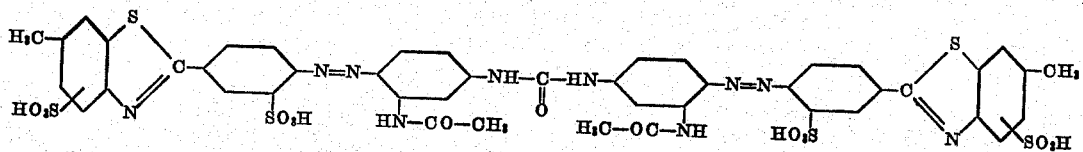

6. The disazo dyestuff of the formula

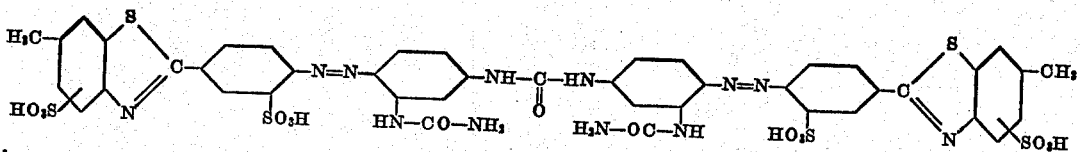

7. The disazo dyestuff of the formula

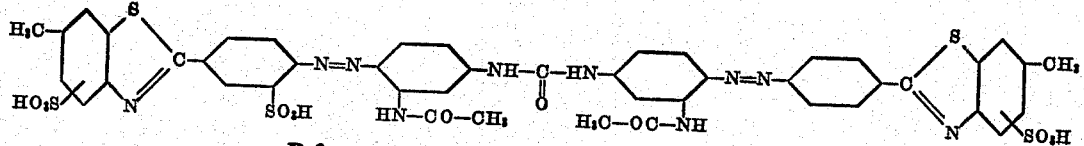

References Cited in the file of this patent
UNITED STATES PATENTS
2,384,283    Conrad et al. _____ Sept. 4, 1945